United States Patent
Lee et al.

(10) Patent No.: US 10,007,328 B2
(45) Date of Patent: Jun. 26, 2018

(54) METHOD AND APPARATUS FOR CONTROLLING SCREEN DISPLAY ON ELECTRONIC DEVICES

(71) Applicant: Samsung Electronics Co., Ltd., Gyeonggi-do (KR)

(72) Inventors: Sungsik Lee, Seoul (KR); Sukjae Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 110 days.

(21) Appl. No.: 14/928,301

(22) Filed: Oct. 30, 2015

(65) Prior Publication Data
US 2016/0124497 A1 May 5, 2016

(30) Foreign Application Priority Data
Oct. 30, 2014 (KR) .................... 10-2014-0149393

(51) Int. Cl.
*G09G 5/00* (2006.01)
*G06F 3/00* (2006.01)
(Continued)

(52) U.S. Cl.
CPC .............. *G06F 3/005* (2013.01); *G06F 3/012* (2013.01); *G06F 3/013* (2013.01); *G06F 3/0412* (2013.01);
(Continued)

(58) Field of Classification Search
CPC .......... G06F 3/005; G06F 3/013; G06F 3/012; G06F 3/0412; G06F 2203/04803; G06K 9/00228; G06K 9/3208; G06T 3/60; G06T 3/40; G06T 3/20; H04M 2250/52; H04M 1/72522
See application file for complete search history.

(56) References Cited

U.S. PATENT DOCUMENTS 8,078,134 B2    12/2011  Kang et al.
8,493,339 B1 *   7/2013  Feehan ................. G06F 3/1423
                                                        345/173
(Continued)

FOREIGN PATENT DOCUMENTS

DE    102007061993    7/2008
JP    2010-154090     7/2010
(Continued)

OTHER PUBLICATIONS

European Search Report dated Jul. 20, 2016 issued in counterpart application No. 15192128.5-1972, 17 pages.
(Continued)

*Primary Examiner* — Rodney Amadiz
(74) *Attorney, Agent, or Firm* — The Farrell Law Firm, P.C.

(57) ABSTRACT

An electronic device and a method of controlling a screen display of the electronic device are provided. The method includes displaying, in one screen, a first display area in which a main task is executed and a second display area in which a sub-task is executed; detecting a rotation of the electronic device; determining a direction of a user's face relative to the electronic device; and determining a direction of the display area based on an angle between a direction of the electronic device and the determined direction of the user's face.

4 Claims, 16 Drawing Sheets

(51) Int. Cl.
  *G06F 3/041* (2006.01)
  *G06F 3/01* (2006.01)
  *G06T 3/60* (2006.01)
  *G06T 3/40* (2006.01)
  *G06T 3/20* (2006.01)
  *G06K 9/00* (2006.01)
  *G06K 9/32* (2006.01)
  *H04M 1/725* (2006.01)

(52) U.S. Cl.
  CPC ....... *G06K 9/00228* (2013.01); *G06K 9/3208* (2013.01); *G06T 3/20* (2013.01); *G06T 3/40* (2013.01); *G06T 3/60* (2013.01); *G06F 2203/04803* (2013.01); *H04M 1/72522* (2013.01); *H04M 2250/52* (2013.01)

(56) References Cited

U.S. PATENT DOCUMENTS

| | | |
|---|---|---|
| 8,655,164 B2 | 2/2014 | Misawa |
| 2008/0158189 A1 | 7/2008 | Kim |
| 2009/0239579 A1 | 9/2009 | Lee et al. |
| 2010/0064259 A1* | 3/2010 | Alexanderovitc .... G06F 1/1626 715/852 |
| 2010/0141575 A1* | 6/2010 | Ohdachi ................ G09G 5/14 345/156 |
| 2012/0290965 A1* | 11/2012 | Ignor .................... G06F 3/0482 715/777 |
| 2013/0176341 A1 | 7/2013 | Jung et al. |
| 2013/0254694 A1 | 9/2013 | Lee |
| 2014/0181700 A1 | 6/2014 | Kim et al. |
| 2014/0189566 A1 | 7/2014 | Kim |
| 2014/0306905 A1 | 10/2014 | Kim et al. |

FOREIGN PATENT DOCUMENTS

| | | |
|---|---|---|
| JP | 2012-014455 | 1/2012 |
| KR | 10-2013-0119223 | 10/2013 |

OTHER PUBLICATIONS

European Search Report dated Mar. 9, 2016 issued in counterpart application No. 15192128.5-1972, 9 pages.

* cited by examiner

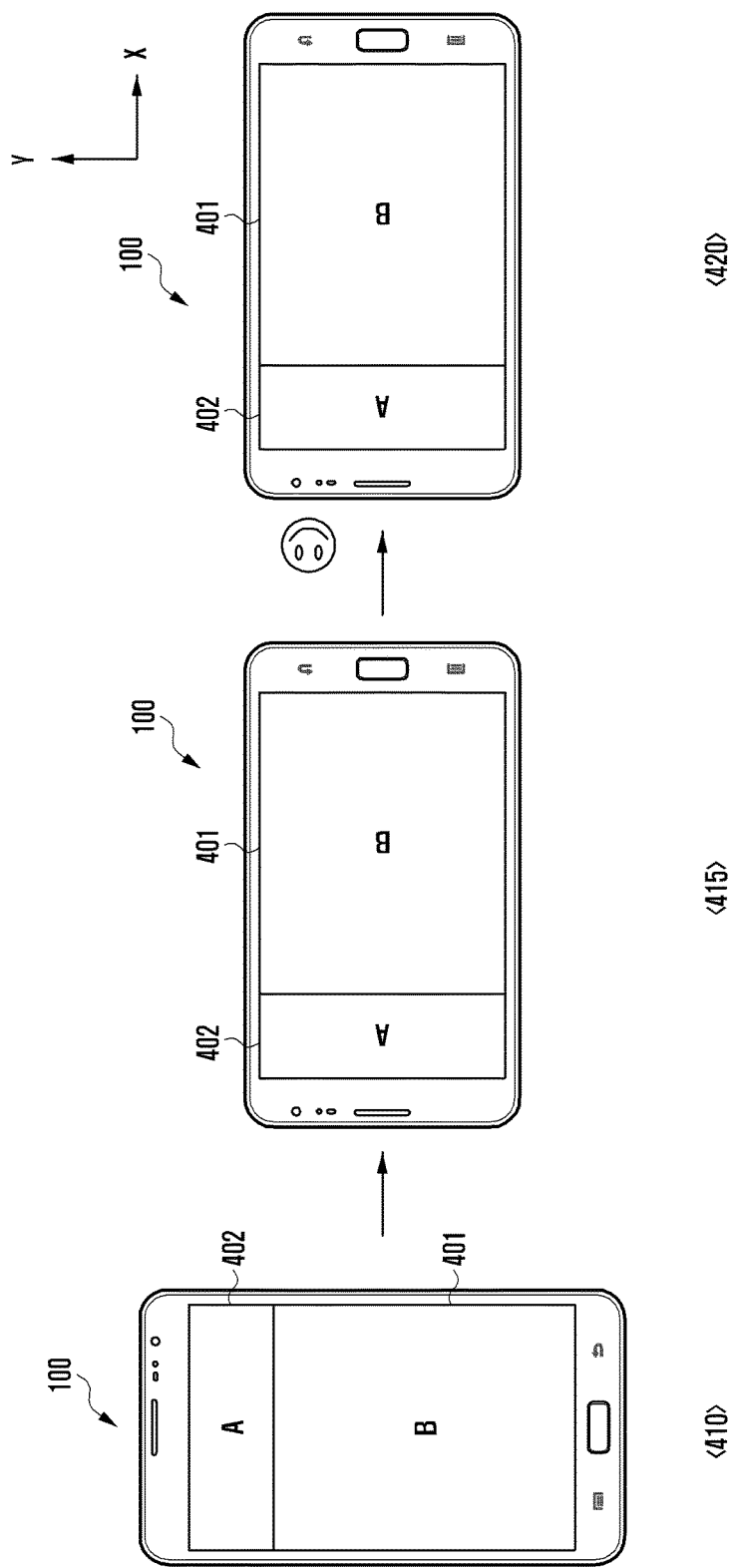

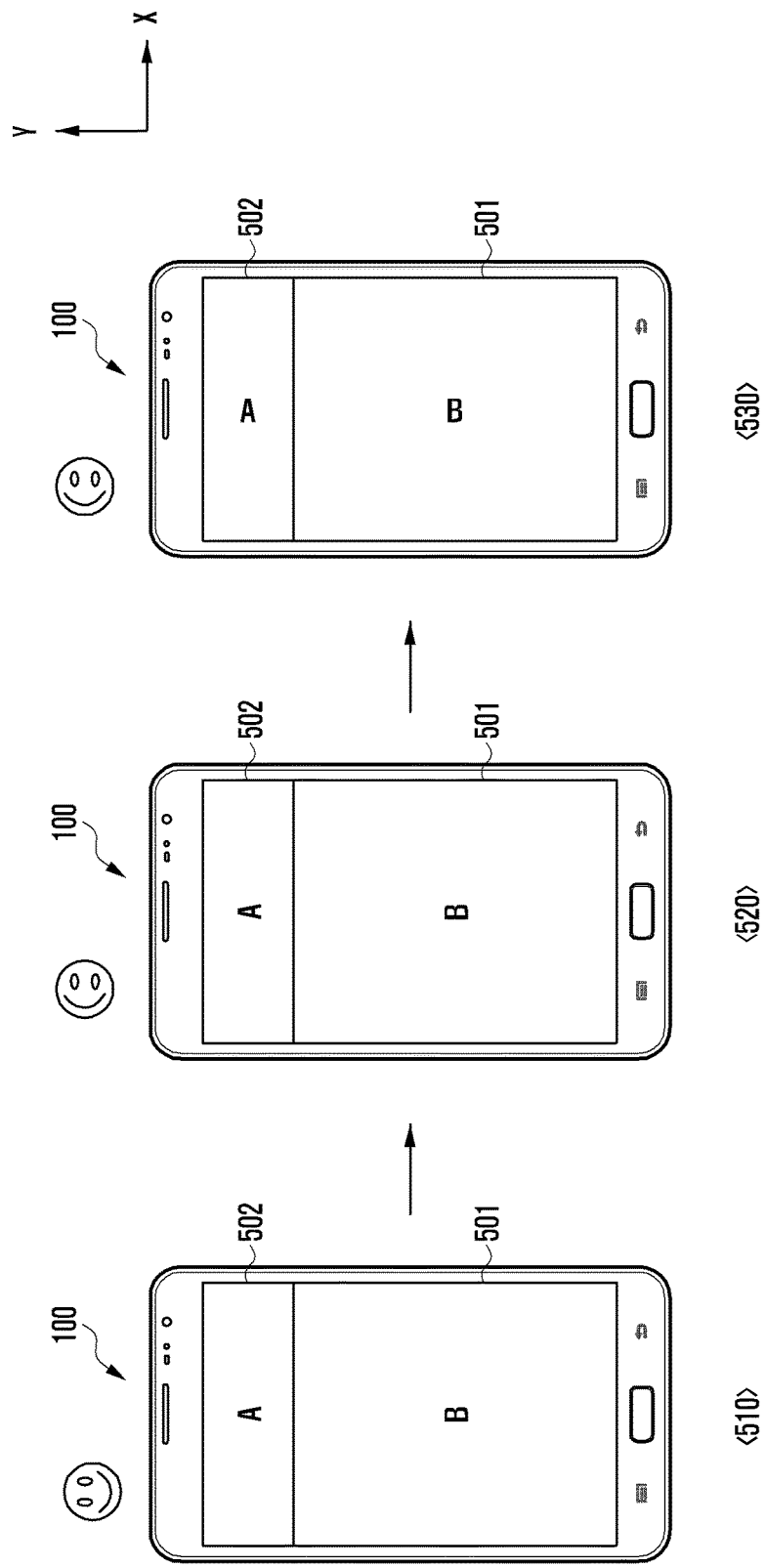

METHOD AND APPARATUS FOR CONTROLLING SCREEN DISPLAY ON ELECTRONIC DEVICES

PRIORITY

This application claims priority under 35 U.S.C. § 119(a) to Korean Patent Application No. 10-2014-0149393, filed in the Korean Intellectual Property Office on Oct. 30, 2014, the entire content of which is incorporated herein by reference.

BACKGROUND OF THE INVENTION

1. Field of the Invention

The present invention relates generally to controlling a screen display, and more particularly, to an electronic device implementing multiple display areas and a method of controlling a screen display in the electronic device.

2. Description of the Related Art

Electronic device have been utilized in various ways according to developments in technology. As the kinds of tasks that can be executed in electronic devices become increasingly diverse, methods of displaying content have also become increasingly varied.

In particular, an electronic device may display multiple operating tasks in one screen. For example, an electronic device may support a multi-display environment providing an overlay window, multiple display areas, and the like in one screen. A multi-display environment enables two or more tasks to be simultaneously performed, without switching screens. An electronic device may also include an automatic rotation function that changes a display direction of an executed task based on a direction in which the electronic device is oriented. Accordingly, there is a need for methods and electronic devices for displaying multiple display areas in a multi-display environment.

SUMMARY OF THE INVENTION

The present invention has been made to address at least the above problems and/or disadvantages and to provide at least the advantages described below. Accordingly, an aspect of the present invention provides a method of displaying a screen in an electronic device has been developed in various forms, but inconvenience may occur when the method is performed without sufficiently understanding a user's intention.

Another aspect of the present invention enables an expansion and a rotation of a display area according to the user's intention by sensitively determining the user's intention in a state of distinguishably displaying an area of a screen displayed by one screen according to the configured reference.

Another aspect of the present invention provides a method of controlling a display area in a manner that coincides with a user intention in an environment providing multiple display areas.

In accordance with an aspect of the present invention, an electronic device is provided. The electronic device includes a display unit configured to displaying a first display area in which a main task is executed and a second display area in which a sub-task is executed; a sensor unit configured to detect a rotation of the electronic device; a camera configured to photograph a user's face located in front of the electronic device; and a controller configured to determine a direction the a user's face relative to the electronic device based on the user's face photographed by the camera, and when the rotation of the electronic device is detected by the sensor unit, determining a display direction of the display area based on an angle between a direction of the electronic device and the determined direction of the user's face.

In accordance with another aspect of the present invention, an electronic device is provided. The electronic device includes a display unit configured to, in one screen, display a first display area in which a main task is executed and a second display area in which a sub-task is executed; a sensor unit configured to detect a rotation of the electronic device; a camera configured to photograph a movement of a user's eye located in front of the electronic device; and a controller configured to determine a position of a user's sight line by analyzing a movement of the user's eye photographed by the camera, and when the rotation of the electronic device is detected by the sensor unit, display the screen in a state in which the direction of a display area has been rotated, while displaying a task in one of the first and second display areas corresponding to the determined position of the sight line expanded to fill the entire screen.

In accordance with another aspect of the present invention, an electronic device is provided. The electronic device includes a display unit configured to, in one screen, display a first display area in which a main task is executed and a second display area in which a sub-task is executed; a sensor unit configured to detect a rotation of the electronic device and a holding position of the electronic device; and a controller configured to, when the rotation of the electronic device is detected, display at least one of the first and second display areas in a state in which the direction of the display area has been changed in response to the rotation, while displaying the first display area to be arranged closer to the detected holding position of the electronic device than the second display area.

In accordance with another aspect of the present invention, an electronic device is provided. The electronic device includes a display unit configured to, in one screen, display a first display area in which a main task is executed and a second display area in which a sub-task is executed; a touch panel configured to detect a user event for a display area expansion; and a controller configured to, based on a determination that the user event for the display area expansion is detected, control display of one of the first and second display areas to expand an entire area in which the first display area and the second display area were previously displayed.

In accordance with another aspect of the present invention, a method of controlling a screen display of an electronic device is provided. The method includes displaying, in one screen, a first display area in which a main task is executed and a second display area in which a sub-task is executed; detecting a rotation of the electronic device; determining a direction of a user's face relative to the electronic device; and determining a direction of the display area based on an angle between a direction of the electronic device and the determined direction of the user's face.

In accordance with another aspect of the present invention a method of controlling a screen display of an electronic device is provided. The method includes displaying, in one screen, a first display area in which a main task is executed and a second display area in which a sub-task is executed; detecting a rotation of the electronic device; determining a position of a user's sight line based on a movement of a user's eye located in front of the electronic device when the rotation of the electronic device is detected; and displaying the screen in a state in which the direction of the screen has been rotated, while displaying a task in one of the first and second display areas corresponding to the determined position of the sight line expanded to fill the entire screen.

In accordance with another aspect of the present invention, a method of controlling a screen display of an electronic device is provided. The method includes displaying, in one screen, a first display area in which a main task is executed and a second display area in which a sub-task is executed; detecting a rotation of the electronic device; determining a holding position of the electronic device; and changing a direction of the screen in response to the rotation of the electronic device, while displaying the first display area in a place closer to the determined holding position than the second display area.

In accordance with another aspect of the present invention, a method of controlling a screen display of an electronic device is provided. The method includes displaying, in one screen, a first display area in which a main task is executed and a second display area in which a sub-task is executed; detecting a user event for an display area expansion; and displaying, in response to the user event for the display area expansion, one of the first display area and the second display area expanded to an entire area in which the first display area and the second display area were previously displayed.

BRIEF DESCRIPTION OF THE DRAWINGS

The above and other aspects, features, and advantages of the present invention will be more apparent from the following detailed description, when taken in conjunction with the accompanying drawings, in which:

FIGS. 4A to 4C are diagrams illustrating performance of an automatic rotation function in a multi-display environment according to an embodiment of the present invention;

FIG. 5 is a diagram illustrating performance of an automatic rotation function in a multi-display environment according to various embodiments of the present invention;

DETAILED DESCRIPTION OF EMBODIMENTS OF THE PRESENT INVENTION

Figure 1:
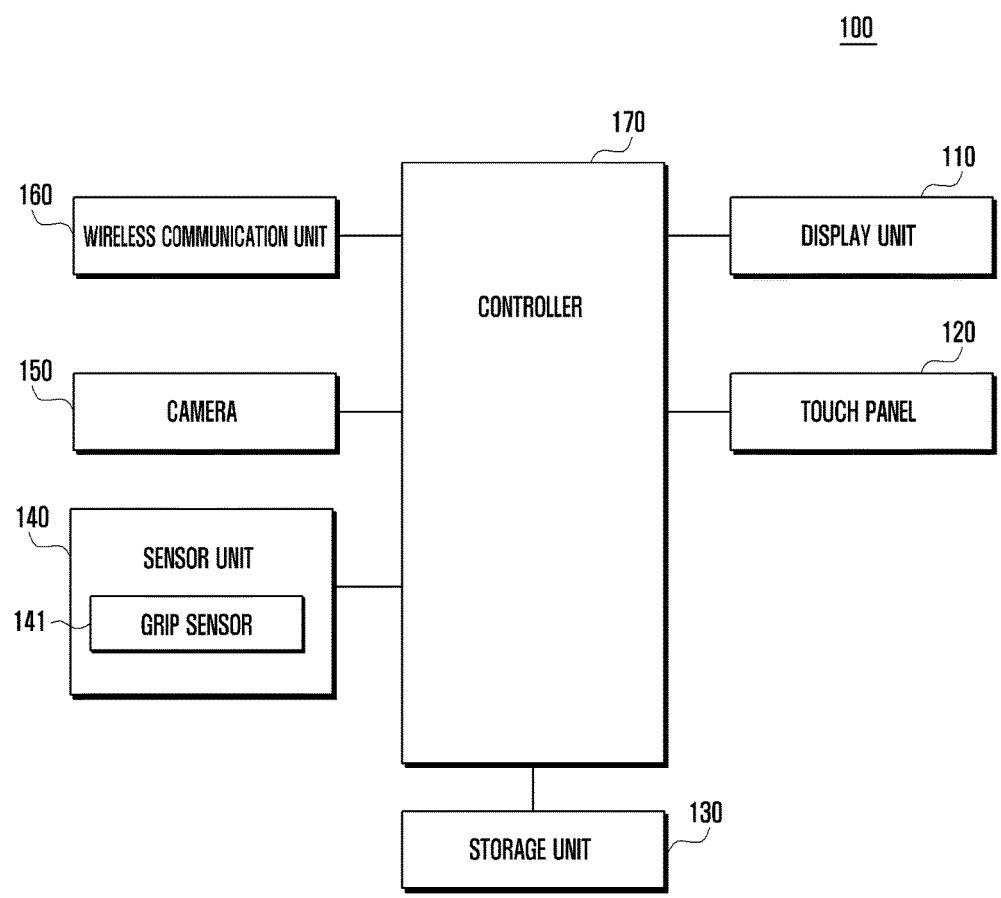
FIG. 1 is a block diagram schematically illustrating a configuration of an electronic device according to an embodiment of the present invention.

Embodiments of the present invention are described in detail as follows with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Embodiments of the present invention are not limited to particular embodiments described herein, but include all modifications, equivalents, and/or alternatives within the spirit and scope of the present invention.

Herein, the terms "include" and "may include" refer to the existence of a corresponding function, operation, or element, but do not limit one or more additional functions, operations, or elements. Terms such as "include" and/or "have" may denote a certain characteristic, number, step, operation, constituent element, component or a combination thereof, but do not exclude the existence of or a possibility of addition of one or more other characteristics, numbers, steps, operations, constituent elements, components or combinations thereof.

Herein, the term "or" includes any or all combinations of words enumerated together. For example, the expression "A or B" may include A, may include B, or may include both A and B.

In the present invention, expressions including ordinal numbers, such as "first" and "second," etc., may modify various elements. However, such elements are not limited by the above expressions. For example, the above expressions do not limit the sequence and/or importance of the elements. The above expressions merely distinguish elements from other elements. For example, the expressions "a first user device" and "a second user device" indicate different user devices, although both of device are user devices. For example, a first element may be referred to as a second element, and similarly, a second element may be referred to as a first element without departing from the scope of embodiments of the present invention.

When an element is referred to as being "connected to" or "accessed by" other elements, the element is not limited to being directly connected to or accessed by the other elements, but also another element may exist between these elements. By contrast, when an element is referred to as being "directly coupled" or "directly connected" to any other element, no other element is interposed therebetween.

The terms provided herein are used to describe specific embodiments of the present invention, and are not intended to limit embodiments of the present invention. As used herein, the singular forms are intended to include the plural forms as well, unless the context clearly indicates otherwise.

Unless defined to the contrary, all terms used herein, which include technical terminologies or scientific terminologies, have the same definition as that understood by a person skilled in the art to which the present invention belongs. Terms such as those defined in a generally used dictionary are to be interpreted to have definitions equivalent to the contextual definitions in the relevant field of art, and are not to be interpreted to have ideal or excessively formal definition, unless clearly defined herein.

An electronic device according to an embodiment of the present invention may include a display. For example, the electronic device may include a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), a Motion Picture Experts Group (MPEG) Audio Layer 3 (MP3) player, a mobile medical device, a camera, or a wearable device (e.g., a Head-Mounted-Device (HMD) such as electronic glasses, electronic clothes, an electronic bracelet, an electronic necklace, an electronic appcessory, an electronic tattoo, or a smart watch).

According to embodiments of the present invention, the electronic device may be embodied as a smart home appliance. Such smart home appliances may include, for example, televisions, Digital Versatile Disk (DVD) players, audio players, refrigerators, air conditioners, cleaners, ovens, microwaves, washing machines, air purifiers, set-top boxes, TeleVision (TV) boxes (e.g., Samsung HomeSync™, Apple TV™, or Google TV™), game consoles, electronic dictionaries, electronic keys, camcorders, or electronic frames.

According to some embodiments of the present invention, the electronic device may include various types of medical devices (e.g., a Magnetic Resonance Angiography (MRA) device, a Magnetic Resonance Imaging (MRI) device, a Computed Tomography (CT) device, a scanning machine, an ultrasonic wave device, etc.), a navigation device, a Global Positioning System (GPS) receiver, an Event Data Recorder (EDR), a Flight Data Recorder (FDR), a car infotainment device, ship electronic equipment (e.g., navigation equipment for a ship, a gyro compass, etc.), avionics, a security device, or an industrial or home robot.

According to some embodiments of the present invention, the electronic device may include a part of furniture or a building/structure, an electronic board, an electronic signature receiving device, a projector, or various kinds of measuring instruments (e.g., a water meter, an electric meter, a gas meter, or a radio wave meter). An electronic device according to embodiments of the present invention may be a combination of one or more of the aforementioned various devices. Further, electronic device according to embodiments of the present invention are not limited to the aforementioned devices.

Hereinafter, an electronic device according to various embodiments of the present invention is described with reference to the accompanying drawings. Herein, the term "user", as used with respect to various embodiments of the present invention, may refer to a person who uses an electronic device or a device (e.g., an artificial intelligence electronic device) that uses an electronic device.

The term "screen", as used herein with respect to various embodiments of the present invention, may refer to a screen of a display unit. For example, in the sentence "A screen, in one screen, displays a first display area in which a main task is executed and a second display area in which a sub-task is executed", the term "screen" refers to a "screen of a display unit". Meanwhile, the term "screen" may refer to a target to be displayed in the display unit. For example, in the sentence "the display unit displays a screen in a determined direction", the term "screen" refers to a target to be displayed.

FIG. 1 is a block diagram schematically illustrating a configuration of an electronic device according to an embodiment of the present invention.

Referring to FIG. 1, an electronic device 100 according to an embodiment of the present invention includes a display unit 110, a touch panel 120, a storage unit 130, a sensor unit 140, a camera 150, a wireless communication unit 160, and a controller 170. Further, the sensor unit 140 includes a grip sensor 141.

The display unit 110 may include, for example, a Liquid Crystal Display (LCD) unit, an Organic Light Emitting Diodes (OLED), an Active Matrix Light Emitting Diodes (AMOLED), etc., which visually provides, to the user, various kinds of information, such as a menu of the electronic device 100, input data, information regarding setting of functions, etc. The display unit 110 may distinguishably display multiple display areas, and the display areas may include a first display area displaying a main task and a second display area displaying a sub-task. In the first display area, for example, an operation (e.g., a video, Digital Multimedia Broadcasting (DMB) or Internet browser) of an application to be displayed in a full-screen mode may be displayed without screen reduction of the application on the screen. The second display area may display, for example, a pre-configured specific application in a widget mode. Further, the second display area may display a pop-up window for notifying of a push notification or a received message. Also, the first display area and the second display area may be implemented by one integrated display area that does not distinguish between the first and second display areas.

In addition, the display unit 110 may horizontally and vertically change a display direction according to a rotation of the electronic device and then display the changed screen. According to an embodiment of the present invention, the display unit 110 may display a screen in a direction determined according to an angle between a direction of a user's face and a direction of the electronic device when at least one change of direction including a rotation of the electronic device or the user's face is detected. According to an embodiment of the present invention, if the electronic device rotates (e.g., rotates from a vertical to a horizontal orientation), the display unit 110 may display a task performed in the display area, in which a user's sight line is located just before the rotation, to the entire screen (e.g., an entire horizontal screen).

Further, according to an embodiment of the present invention, when an expansion requirement of an area occurs in a multi-display environment, the display unit 110 may display a notification for the corresponding requirement in an area of the screen. For example, the display unit 110 may display the notification around a boundary line of the display area. More specifically, when the expansion requirement of the first display area occurs, the display unit 110 may display a visual object requiring a user event (e.g., a drag) in a direction of the second display area on the boundary line, and the reverse is also the same. The display unit 110 may expand a corresponding display area (the first display area and the second display area) as the user events corresponding to the expansion requirement and the notification are input, and then display the expanded display area to the entire screen. In addition, the display unit 110 may display the first display area, in which the main task is displayed, on a screen which is distinguished into the first display area and the second display area in a direction close to a position of a hand holding the electronic device 100.

The touch panel 120 may receive a touch event of the user input in the electronic device 100 (i.e., generate a touch event in response to received user input) and then transfer the received touch event to the controller 170. For example, the touch panel 120 may detect a touch user input due to a user's hand holding the electronic device 100. Further, the touch panel 120 may receive a user event for entering the multi-display environment or releasing the multi-display environment and a user event for expanding one of the display areas. In addition, the touch panel 120 may receive an event of a user's touch or a drag for expanding the corresponding display area, when a notification notifying the user that the display area expansion requirement occurs is displayed.

The storage unit 130 may include a main memory and a secondary memory. The main memory may be implemented by, for example, a Random Access Memory (RAM). The second memory may be implemented by, for example, a disk, a RAM, a Read-Only-Memory (ROM), or a flash memory. The main memory may store various programs loaded from the secondary memory, for example, a booting program, an operating system, and applications. The storage unit 130, according to an embodiment of the present invention may store a program and a configuration value for implementing a multi-display environment. Further, the storage unit 130 may store a mapping table for determining a position of a user's sight line on the basis of information corresponding to an input movement of a user's eye. Further, the storage unit 130 may store, in the form of a mapping table, a screen direction configuration value that is set according to an angle between a direction of a device required to perform a function according to the embodiment of the present invention and a direction of a user's face. The storage unit 130 may further store other information required to perform various function according to embodiments of the present invention.

The sensor unit 140 may include a grip sensor 141. The sensor unit 140 may further include, for example, a gyro sensor for detecting an inclination degree of the electronic device, an acceleration sensor, a proximity sensor for detecting the proximity, an iris sensor for user recognition, and a fingerprint sensor. The grip sensor 141 operates when a pressure, which is greater than a predetermined level configured by a user, is detected. According to various embodiments of the present invention, the grip sensor 141 may be located at four side surfaces of the electronic device. The grip sensor 141 may transmit information regarding a side in which a pressure is detected by the user, to the controller 170. Therefore, the controller 170 may determine a position/orientation in which the user holds the electronic device on the basis of information detected by the grip sensor 141. In addition, the sensor unit 140 may acquire rotation information of a device used for a determination basis for changing a screen display direction of the electronic device 100. Specifically, when the electronic device 100 rotates, the gyro sensor of the sensor unit 140 may sense a direction and an angle therefore, and transmit the sensed information to the controller 170.

The camera 150 performs, under a control of the controller 170, a function of photographing a subject and then outputting the photographed subject to the controller 170. Specifically, the camera 150 may include a lens for gathering light, an image sensor for converting the received light into an electrical signal, and an Image Signal Processor (ISP) for processing the electrical signal input from the image sensor as raw data and outputting the processed electrical signal to the controller 170. The camera 150, according to an embodiment of the present invention, may scan an image of both of a user's eyes in order to detect a direction of a user's face and transmit corresponding information to the controller 170. Further, the camera 150 may scan a user's iris or a movement of a whole face, in order to determine a position (e.g., a position of a sight line) on a screen at which the user looks, and transmit corresponding information to the controller 170.

The wireless communication unit 160 may perform a wireless communication function of the electronic device. The wireless communication unit 160 may include, for example, a Radio Frequency (RF) transmitter for up-converting and amplifying a frequency of a transmitted signal, and an RF receiver for low noise amplifying a received signal and down-converting a frequency. Further, the wireless communication unit 160 may include, for example, a mobile communication module, such as a Long Term Evolution (LTE) module and a Code Division Multiple Access (CDMA) module, a digital broadcasting module, such as a DMB module, or a Digital Video Broadcasting (DVB) module, a wireless Internet communication module, such as Wi-Fi or Wireless broadband (Wibro), or a near field communication module such as Near Field Communication (NFC) module, or a Bluetooth module. The wireless communication unit 160 according, to an embodiment of the present invention, may detect a generation of an external communication related event relating to a screen display area expansion request, such as text message reception, call reception, and a push notification.

The controller 170 may control general operations performed in the electronic device. The controller 170, according to an embodiment of the present invention, may control the display unit 110 to display a screen that distinguishes between multiple display areas. Further, the controller 170 may determine whether a screen expansion event has been received from the user on the basis of information detected by the touch panel 120, and a holding position of the electronic device 100.

The controller 170 may determine a holding position based on grip information sensed by the sensor unit 140, and the sensor unit 140 may determine whether a device rotates, and a rotation direction (e.g., a direction of rotation of an upper end direction of the electronic device 100) on the basis of inclination information sensed by the sensor unit 140. Herein, "upper end direction" of an object refers to a direction from the bottom of an object towards the top of an object. For example, an upper end direction of the electronic device 100 is a direction from the bottom towards the top of the electronic device 100.

In addition, the controller 170 may determine a screen control operation based on the determined pieces of information, such as information regarding holding position, device rotation, and rotation direction. When a rotation function is configured to be operated according to a direction of a user's face, the controller 170 may determine a screen display direction according to an angle between the upper end direction of the electronic device 100 and an upper end direction of the user's face even, though the electronic device 100 rotates. Further, when an automatic expansion function is configured to operate according to a location of the sight line, the controller 170 may control a screen corresponding to the display area, in which a user's sight line is maintained during the rotation, to be expanded to the entire screen, and then display the expanded screen, wherein the controller 170 controls a screen to be displayed according to a rotation direction if the electronic device 100 rotates. In addition, when a screen display control function according to a holding position of the electronic device 100 is configured, the controller 170 may configure a position of a display area displaying a main task to be close to a holding position of the user and thus display the main task according to the configured position, wherein the controller 170 controls the screen to be displayed according to the rotation direction if the electronic device 100 rotates.

When a screen display area expansion request is generated, the controller 170 may control the display unit 110 to display information indicating the request has been generated and a notification notifying the user of a display area in which the request is generated. Further, when a user event (e.g., a touch input or a drag) is generated in the area in which the notification is displayed, the controller 170 may make a control expansion of a corresponding display area and thus display the expanded area.

Figure 2:
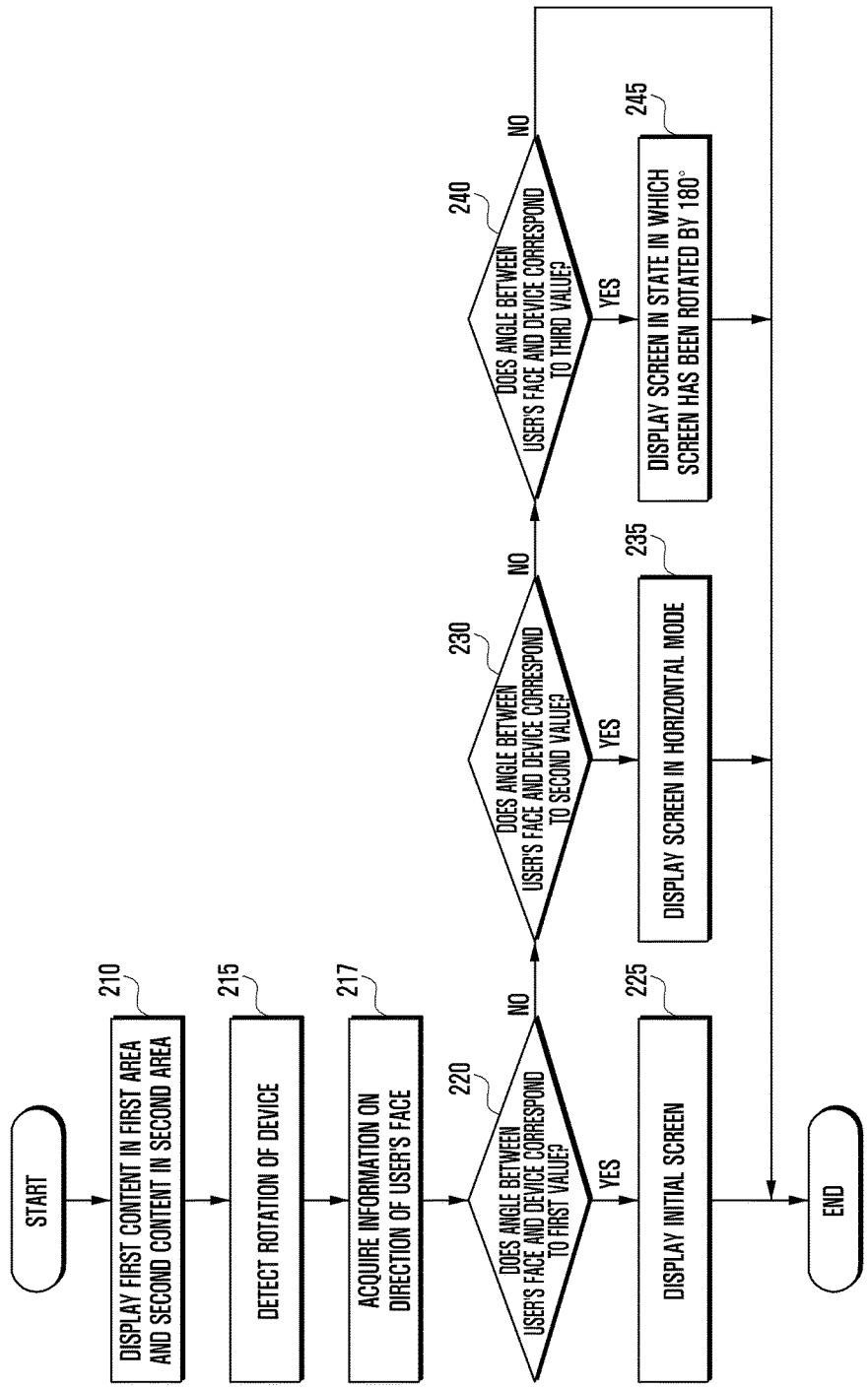
FIG. 2 is a flow chart illustrating method of performing an automatic rotation function according to an embodiment of the present invention.

FIG. 2 is a flow chart illustrating a method of performing an automatic rotation function according to an embodiment of the present invention.

Referring to FIG. 2, the controller 170, according to an embodiment of the present invention, in operation 210, distinguishes a first area and a second area on a screen, displays a first content (a main task) in the first area, and displays a second content (a sub task) in the second area. Operation 210 corresponds to a state in which a device is vertically oriented.

For further detail, operation 210 is further described with reference to FIG. 3 as follows.

Figure 3:
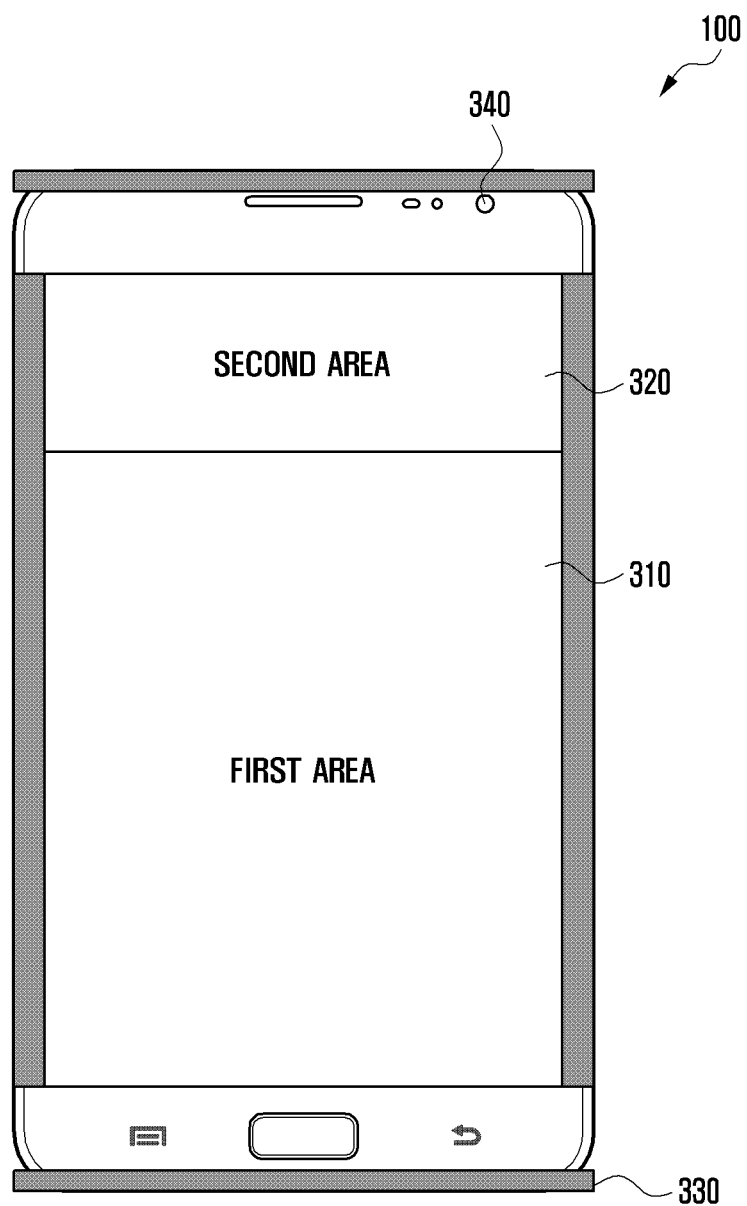
FIG. 3 is a diagram illustrating a multi-display environment of an electronic device according to an embodiment of the present invention.

FIG. 3 is a diagram illustrating a multi-display environment of an electronic device according to an embodiment of the present invention.

Referring to FIG. 3, a screen of the electronic device 100 distinguishably displays a first display area 310 and a second display area 320. The first display area 310 of the electronic device 100 may be larger than the second display area 320 as shown in FIG. 3, and may display a task execution at a rate identical to a rate at which task execution is displayed on a screen of a general electronic device. The second display area 320 may be smaller than the first display area 310 and may display an execution screen of a pre-configured sub-task, such as a widget.

The first display area 310 and the second display area 320 may be independently operated. For example, when a calendar widget, a text message widget, and a weather widget are included in a list of predetermined sub-tasks in the second display area 320, and when the user perform a swipe operation in the second display area 320, widget execution screens corresponding to a calendar, a text message, and weather may be alternately displayed, regardless of a state of the first display area 310. However, embodiments of the present invention are not limited thereto, and the first display area 310 and the second display area 320 may be linked, and variously displayed according to needs of the electronic device 100 and/or the user.

In an environment in which a screen with multiple display areas is displayed as described above, the controller 170 acquires information regarding a direction of a user's face, in operation 217, when a rotation of the electronic device 100 is detected, in operation 215. The information regarding the direction of the user's face may be initially determined based on a user face image photographed using a front camera 340 (as shown in FIG. 3) of the electronic device 100.

Then, the controller 170 determines whether an angle between the user's face and the electronic device 100 corresponds to a first value, in operation 220. The first value may be a range of values corresponding to a predetermined error range near 0°. A side in which a front speaker and the front camera 340, which are used during a call, are located is generally referred to as an upper side of the electronic device 100 and a side, in which a microphone is located, is generally referred to as a lower side of the electronic device 100. If a direction of an upper end of the electronic device 100 and a direction of an upper end of the user's face (i.e., a direction in which the top of the head is oriented) are identical, an angle between the user's face and the electronic device 100 corresponds to about 0°. As described above, the controller 170 performs operation 225 of displaying an initial screen identical to the screen displayed in operation 210. Operation 225 is described in more detail as follows with reference to FIG. 4A.

Figure 4B:
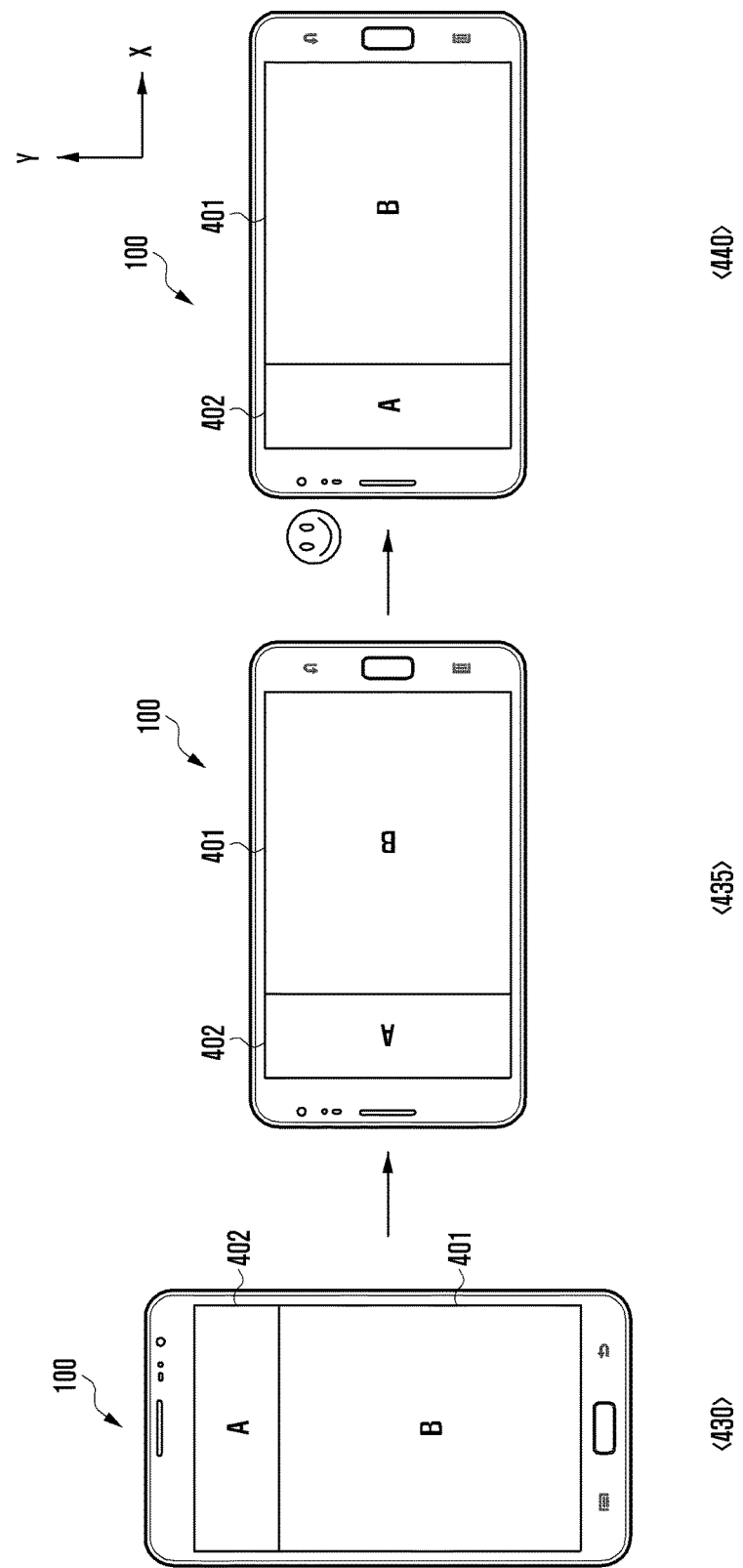

The view as indicated by reference numeral 410 of FIG. 4A is a diagram illustrating a multi-display environment in which a first display area 401 and a second display area 402 are displayed on one screen. When, in a state in which the two display areas 401 and 402 are displayed and an upper end of a device is rotated (the upper end of the electronic device 100 is oriented in a direction of a negative x axis) by 90° to the left side as shown in the view indicated by reference numeral 415, and an upper end of a user's face is rotated by 90° to the left side as shown in reference numeral 420, an angle between directions of a device and the user's face becomes a value close to 0°. When the angle between the direction of the electronic device 100 and the direction of the user's face corresponds to a first value close to 0°, the screen of the electronic device can be displayed in a direction identical to the direction of the user's face, instead of displaying a horizontal mode, as shown in the view indicated by reference numeral 420. That is, when the angle between the direction of the electronic device and the direction of the user's face corresponds to the first value, the electronic device may not perform an automatic rotation function. In FIGS. 4A-4C, 5, 7A-7B, 9A-9B, and 11A and 11B, the display orientation relative to the electronic device is indicated by the orientation of letters "A" and "B" within the first and second display areas.

Meanwhile, when it is determined that the angle between the user's face and the electronic device 100 does not correspond to the first value, in operation 220 in FIG. 2, the controller 170 determines whether the angle between the user's face and the electronic device 100 corresponds to a second value, in operation 230. The second value may be a range of values corresponding to a predetermined error range near 90°. When the angle between the user's face and the electronic device 100 corresponds to the second value, the top of the head of the user may be oriented in a direction facing away from the ground, and the upper end of the electronic device 100 may be oriented in a direction parallel to the ground. When it is determined that the angle between the user's face and the electronic device 100 corresponds to the second value close to 90° in operation 230, the controller 170 rotates a direction of the screen by 90°, such as in the horizontal mode, and then displays the rotated screen, in operation 235.

Referring to FIG. 4B to further describe operation 235, as shown in FIG. 4B, a screen distinguishably displays two display areas 401 and 401 in the view indicated by reference numeral 430. In the view indicated by reference numeral 435, an upper end of a device is rotated to be oriented to a negative x axis. When the electronic device 100 is rotated, information regarding a direction of a user's face input by a front camera may be acquired. When a direction, in which the top of the head of the user is oriented, is oriented to a positive y axis, as shown in the view indicated by reference numeral 440, an angle between the direction of the top of the head of the user and a direction, in which the upper end of the electronic device 100 is oriented, becomes about 90°.

This angle may correspond to a situation in which the electronic device 100 is rotated by about 90° to the right side without a rotation of the user's face (i.e., a situation in which the upper end of the electronic device 100 is oriented to the positive x axis). When the angle between the direction of the upper end of the user's face and the direction of the upper end of the electronic device 100 corresponds to a second value (e.g., a range of values corresponding to a predetermined error range near 90°), the screen may be displayed by being horizontally rotated as shown in the view indicated by reference numeral 440.

Further, when it is determined that the angle between the direction of the user's face and the direction of the electronic device 100 does not correspond to the second value, in operation 230 in FIG. 2, the controller 170 determines whether the angle between the direction of the user's face and the direction of the electronic device 100 corresponds to a third value, in operation 240. The third value may be a range of values corresponding to a predetermined error range near 180°. When the angle between the direction of the user's face and the direction of the electronic device 100 corresponds to the third value, the controller 170 displays a screen in a state in which a direction of the screen displayed in the electronic device 100 has been rotated by 180°, in operation 245. Operation 245 is described in further detail with reference to FIG. 4C.

Figure 4C:
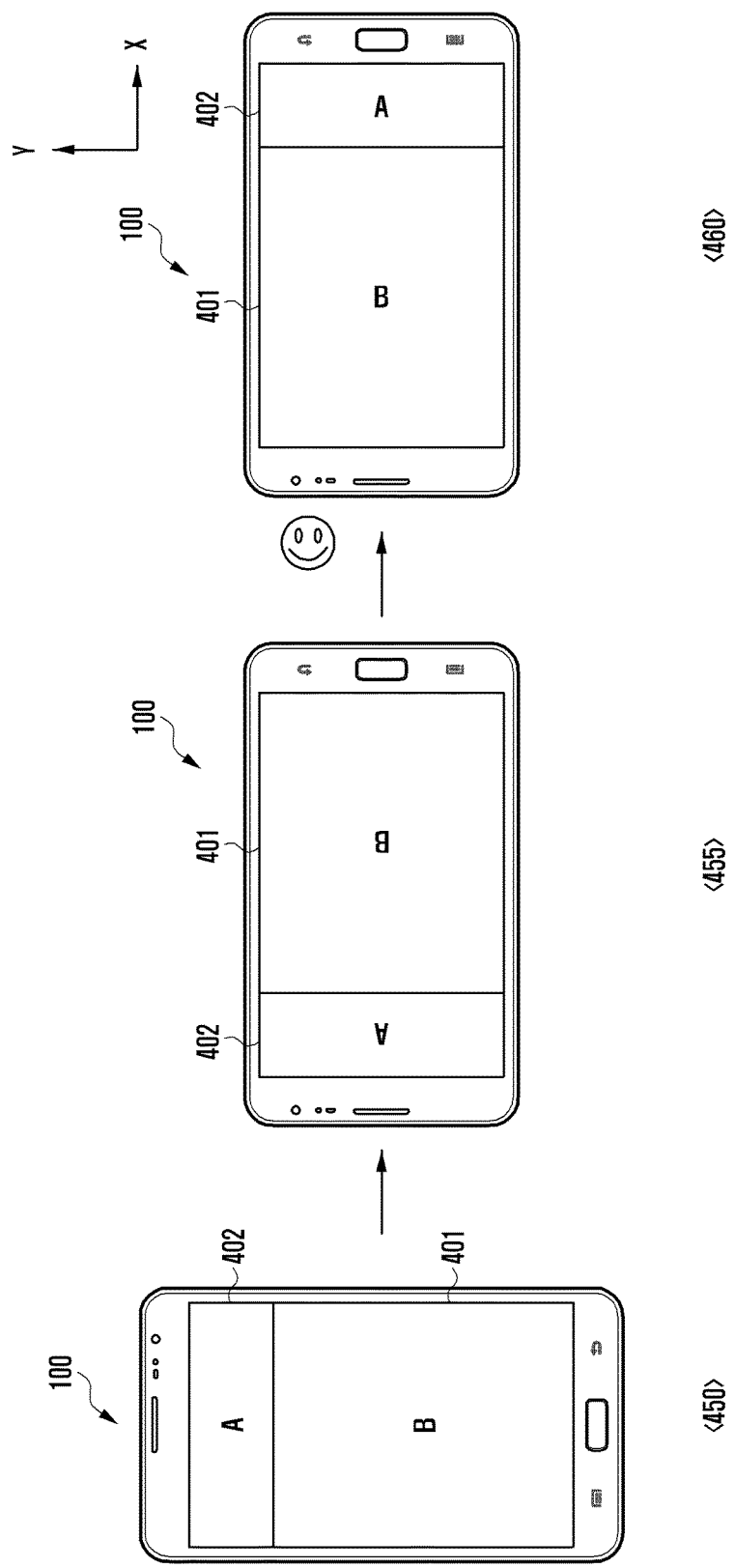

Referring to FIG. 4C, the view indicated by reference numeral 450 illustrates a state in which a device is vertically oriented. When the electronic device 100 is rotated by 90° to the left side (i.e., counterclockwise) as shown in the view indicated by reference numeral 455, an upper end of the electronic device 100 is oriented in a direction of a negative x axis. When the electronic device 100 is rotated in a specific direction, information regarding the direction of the upper end of the user's face may be acquired. In this event, when a user's face is rotated by 90°, as shown in the view indicated by reference numeral 460, the upper end of the user's face is oriented to a direction of a positive x axis. When the electronic device 100 is oriented to the direction of the negative x axis and the user's face is oriented to the positive x axis, the angle between the upper ends of the electronic device 100 and the user's face corresponds to a value close to 180°. When the angle between the direction of the upper end of the user's face and the direction of the upper end of the electronic device 100 corresponds to the third value close to 180°, a display direction of the screen can be reversed by 180°, as shown in the view indicated by reference numeral 460.

FIG. 5 is a diagram illustrating performance of an automatic rotation function in a multi-display environment according to various embodiments of the present invention.

According to an embodiment of the present invention, the controller 170 may perform an automatic rotation function even when a rotation of a device is not detected. According to an embodiment of the present invention, the controller 170 may determine whether the angle between the user's face and the electronic device 100 corresponds to a first value to a third value, even when the rotation of the electronic device 100 is not detected.

As shown in the view indicated by reference numeral 510 of FIG. 5, an electronic device may support a multi-display environment in which a screen a first display area 501 and a second display area 502 are distinguishably displayed. Further, in this event, a direction, in which an upper end of the electronic device is oriented, corresponds to a positive y axis and an upper end of a user's face is also oriented in a direction of the positive y axis. In this event, as shown in the view indicated by reference numeral 520, while a direction of the electronic is not changed, a direction of the user's face may be rotated by 90°. The direction of the upper end of the rotated user's face may be located to be oriented in a direction of the positive x axis. When the direction of the upper end of the electronic device 100 corresponds to the positive y axis and the direction of the upper end of the face corresponds to the x axis, an angle between the direction of the upper end of the electronic device 100 and the direction of the upper end of the face may correspond to a value which approximates to about 90°. In this event, it is determined that the angle between the direction of the upper end of the face and the direction of the upper end of the electronic device 100 corresponds to a second value. When it is determined that the angle corresponds to the second value, the screen of the electronic device may display, for example, a horizontal mode screen as shown in the view indicated by reference numeral 530. The upper end of the changed screen may be oriented to the positive x axis like the direction of the upper end of the user's face. Further, when the electronic device 100 is not rotated, but the user's face is oriented to a negative x axis and then is rotated by 90°, the screen of the electronic device may be displayed a screen in a horizontal mode, in which the upper end corresponds to the negative x axis.

Figure 6:
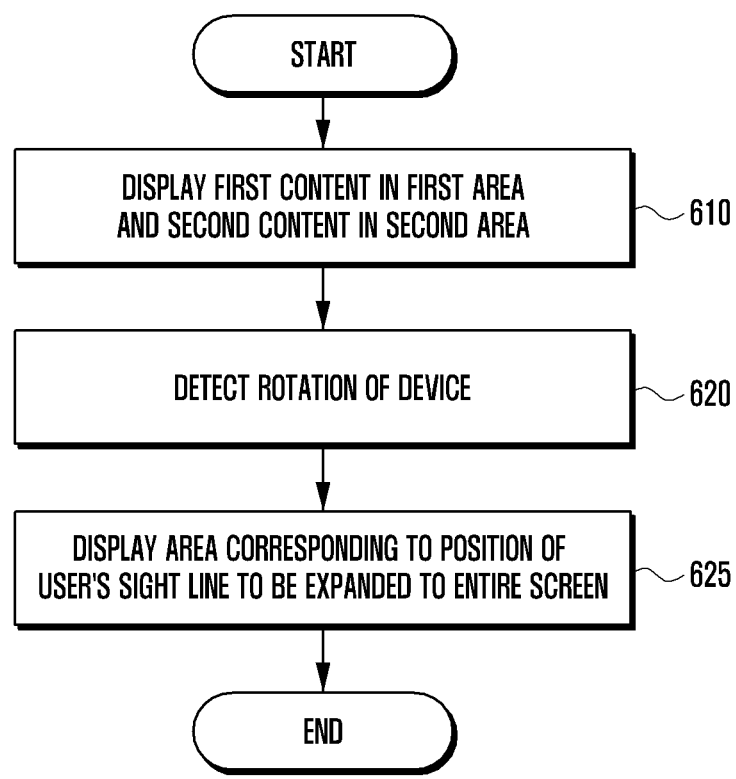
FIG. 6 is a flow chart illustrating a method of performing a screen display control function according to sight line detection in an electronic device according to an embodiment of the present invention.

FIG. 6 is a flow chart illustrating a process of a screen display control function according to sight line detection in an electronic device according to an embodiment of the present invention.

Referring to FIG. 6, in operation 610, the controller 170 distinguishably displays a first display area and a second display area, wherein the controller 170 displays a first content (e.g., a main task) in the first area and displays a second content (e.g., a sub-task) in the second area. When detecting a rotation of a device in operation 620, the controller 170 determines a display area (one of the first display area and the second display area) in which a user's sight line is located during the rotation. Then, the controller 170 expands a display area corresponding to a position in which the user's sight line is located and then display the expanded display area to the entire screen, in operation 625. In this event, the position of the user's sight line may be determined with various methods. First, the controller 170 momentarily determines a position of a user's sight line by activating a function of each device (e.g., the front camera 340) for detecting the user's sight line when determining the rotation of the electronic device 100. In addition, the controller 170 may activate a device for detecting the user's sight line and determine a display area in which the position of the user's sight line is frequently maintained. For example, the controller 170 may detect the rotation of the electronic device 100 in a situation in which it is determined that the user's sight line is maintained in the first display area. In this event, the controller 170 displays a screen in a state in which a screen corresponding to the first display area has been rotated according to a direction of the rotation of the electronic device 100, wherein the controller 170 may display the screen by expanding the screen to the entire screen. In addition, a performance order and process of operations used in determining the position of the sight line may progress by various methods in accordance with embodiments of the present invention.

Further, according to the embodiment of the present invention, operation 625 may be performed by being limited to a case in which the electronic device 100 rotates from vertical to horizontal. Operation 625 may correspond to a method of displaying a screen of the display area in which the user's sight line is maintained by expanding the screen to a horizontally displayed entire screen.

A method of expanding the screen according to the user's sight line during the rotation of the electronic device are described in more detail as follows with reference to FIGS. 7A and 7B.

Figure 7A:
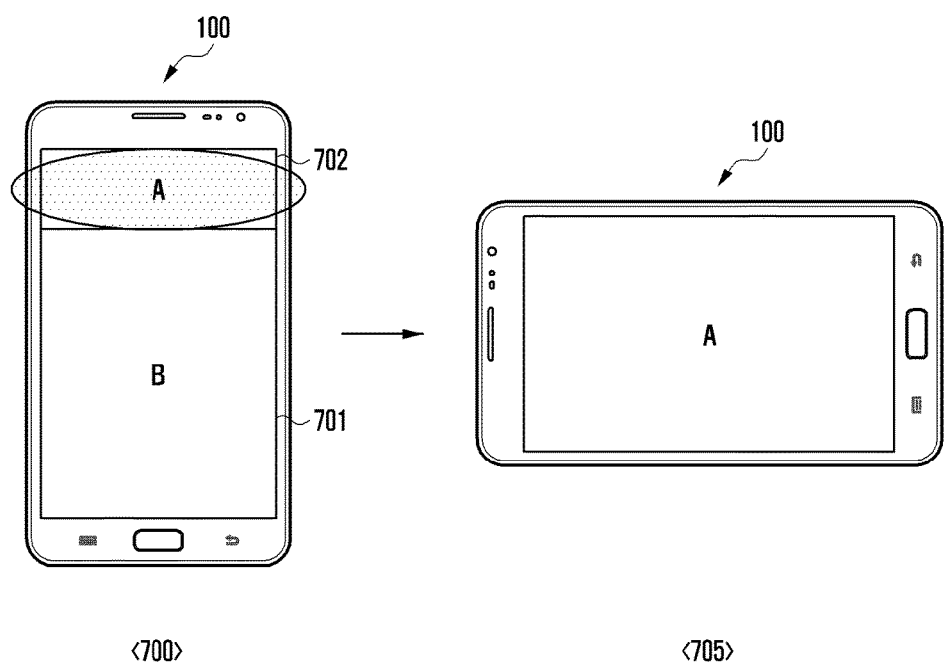
FIGS. 7A and 7B are diagrams illustrating a sight line detection based screen expansion method according to an embodiment of the present invention.
Figure 7B:
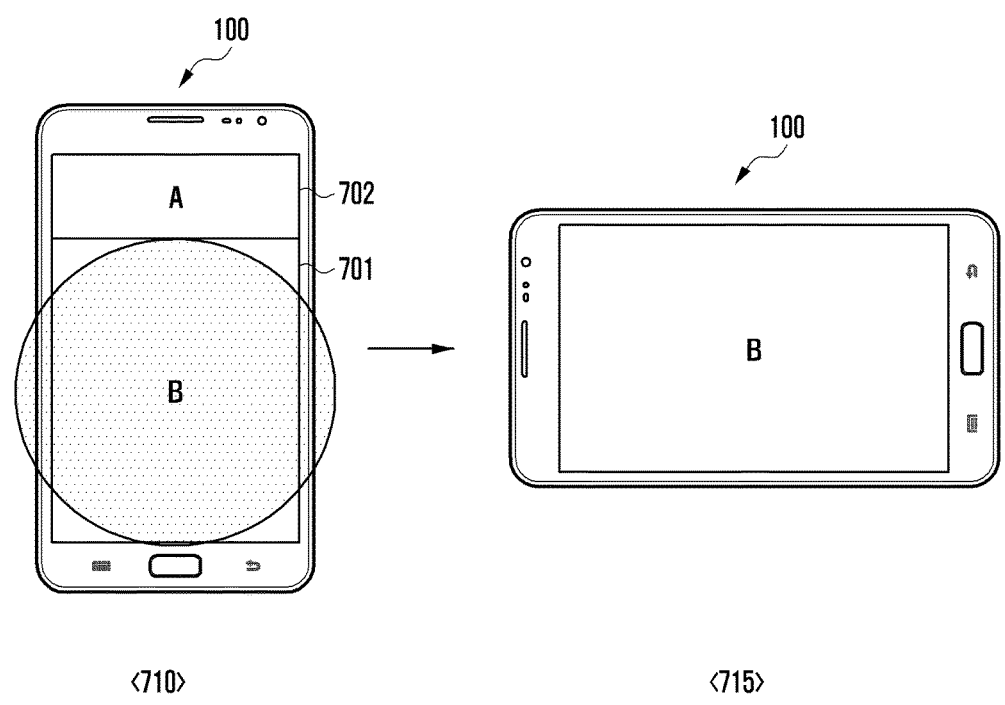

FIGS. 7A and 7B are diagrams illustrating a sight line detection based screen expansion method according to an embodiment of the present invention.

Referring to FIG. 7A, the view indicated by reference numeral 700 illustrates that a range in which a user's sight line is maintained is located in a second area 702, which is displaying a sub-task. The controller 170 of the electronic device 100 may determine a position on a screen in which the user's sight line is maintained on the basis of a movement of a user's eye (e.g., a pupil) detected using the camera 150. According to this scheme, the controller 170 may determine that the position in which the user's sight line is maintained corresponds to the second area 702. In this event, when the electronic device 100, which is vertically oriented, as shown in the view indicated by reference numeral 700, is horizontally rotated as shown in the view indicated by reference numeral 705, the controller 170 may perform a sight line detection based screen expand function, according to an embodiment of the present invention. Specifically, when the electronic device 100 is horizontally rotated, as shown in the view indicated by reference numeral 705, the controller 170 may display a screen corresponding to the display area, in which a user's sight line stayed during the rotation, to the entire screen. For example, when a music reproduction program is displayed in a widget mode in the second display area 702, the music reproduction program may be displayed, in not the widget mode, but in a full-screen mode as shown in the view as indicated by reference numeral 705.

Referring to FIG. 7B, the view indicated by reference numeral 710 illustrates that an electronic device 100 which is vertically oriented and two display areas are illustrated in a screen of the electronic device 100. When a display area, in which it is detected that the user's sight line is maintained, corresponds to the first display area 701, if the electronic device is rotated to be in a horizontal state, as shown in the view indicated by reference numeral 715, the screen of the electronic device 100 is automatically configured in the horizontal direction and a task performed in the first display area 701 can be displayed in a manner that fills the entire screen. According to an embodiment of the present invention, a screen may be displayed by expanding the task of the display area corresponding to the user's sight line, during the rotation of the electronic device 100, to fill the entire screen.

Figure 8:
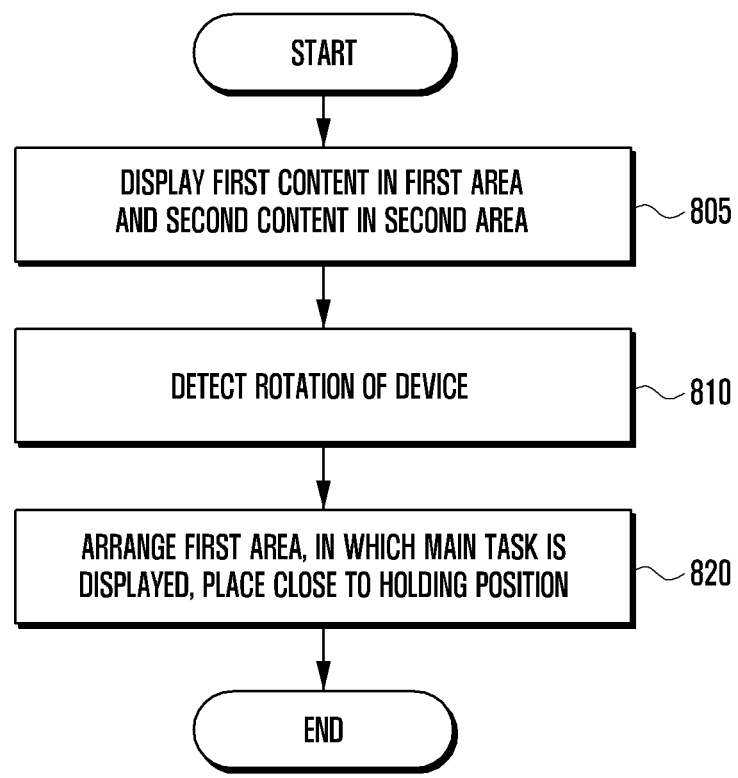
FIG. 8 is a flow chart illustrating method of performing a holding position based screen arrangement function according to an embodiment of the present invention.

FIG. 8 is a flow chart illustrating a method of performing a holding position based screen arrangement function according to an embodiment of the present invention.

Referring to FIG. 8, a controller 170, in operation 805, displays a first content (e.g., a main task) in a first display area and a second content (e.g., a sub-task) in a second display area. In operation 805, a device may be, for example, vertically displayed as shown in FIG. 3.

Then, the controller 170 detects a rotation (e.g., a horizontal rotation) of the electronic device 100, in operation 810. In operation 820, the controller 170 arranges the first display area, in which the main task is displayed, in a location close to a holding position of the electronic device 100. The holding position may be determined based on a position in which a pressure is detected by the grip sensor 141 (as indicated by reference numeral 330 in FIG. 3) or a touch area detected by the touch panel 120. In addition, the holding position may be determined according to various methods and in various orders of operation, in accordance with embodiments of the present invention. For example, the controller 170 may activate each device (e.g., a grip sensor) for detecting the holding position as the rotation of the electronic device 100 is detected and determine the holding position based on information regarding the detected grip. Further, the controller 170 may frequently receive information regarding an area detected by the grip sensor or a touch area detected by a touch panel, and may acquire information regarding the holding related area and determine the holding position based on corresponding information as the rotation of the electronic device 100 is detected.

A method of controlling a screen according to a holding position is described in more detail as follows with reference to FIGS. 9A and 9B.

Figure 9A:
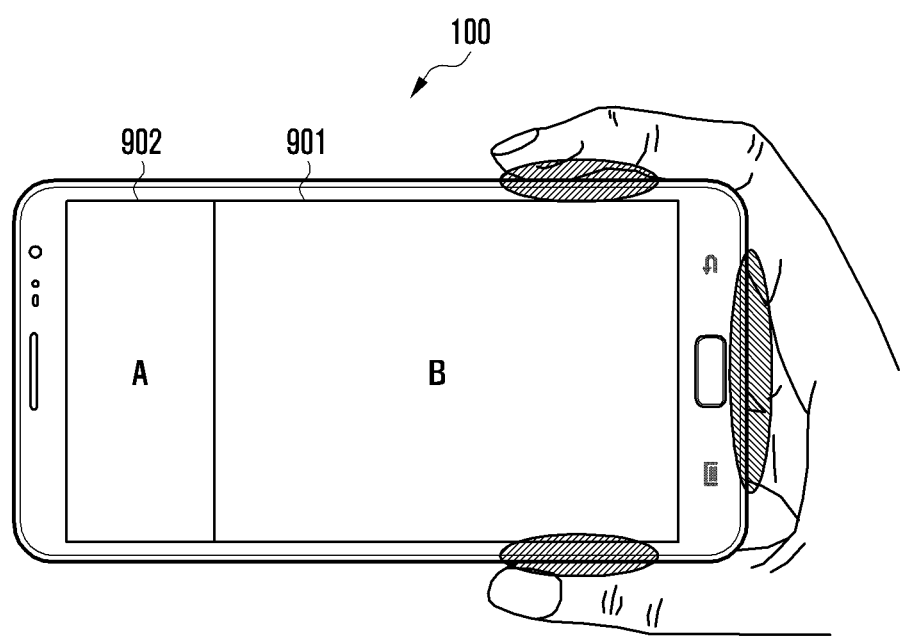
FIGS. 9A and 9B are diagrams illustrating a holding position based screen arrangement function according to an embodiment of the present invention.
Figure 9B:
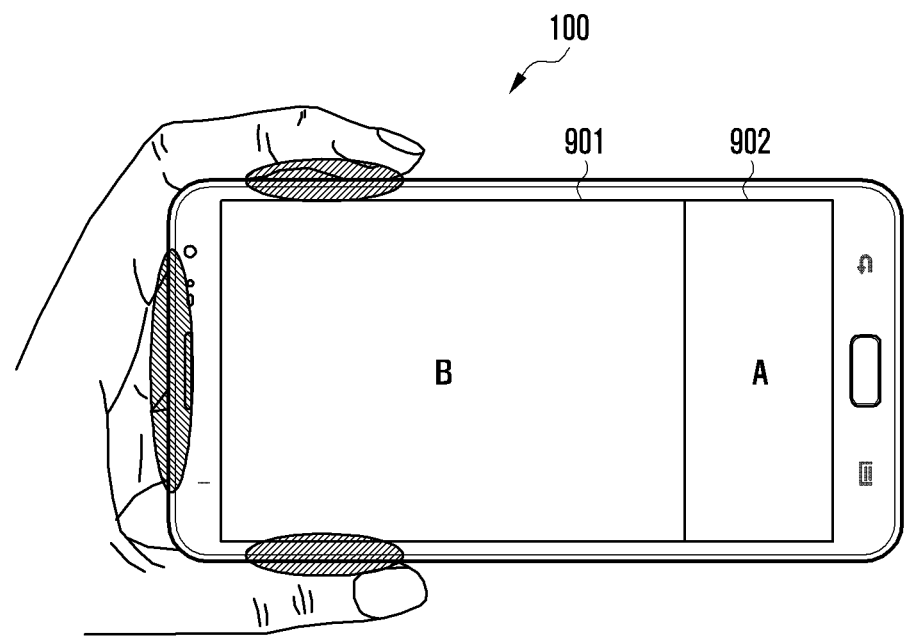

FIGS. 9A and 9B are diagrams illustrating a holding position based screen arrangement function according to an embodiment of the present invention.

FIG. 9A illustrates an example in which a user holds a right side of the electronic device 100 in a horizontal orientation. Based upon a determination that a right side of the electronic device 100 is held, the controller 170 may display a first display area 901, which corresponds to an area in which a main task is displayed, on the right side, and display a second display area 902, which corresponds to an area in which a sub-task is displayed, on the left side of the electronic device 100.

Figure 10:
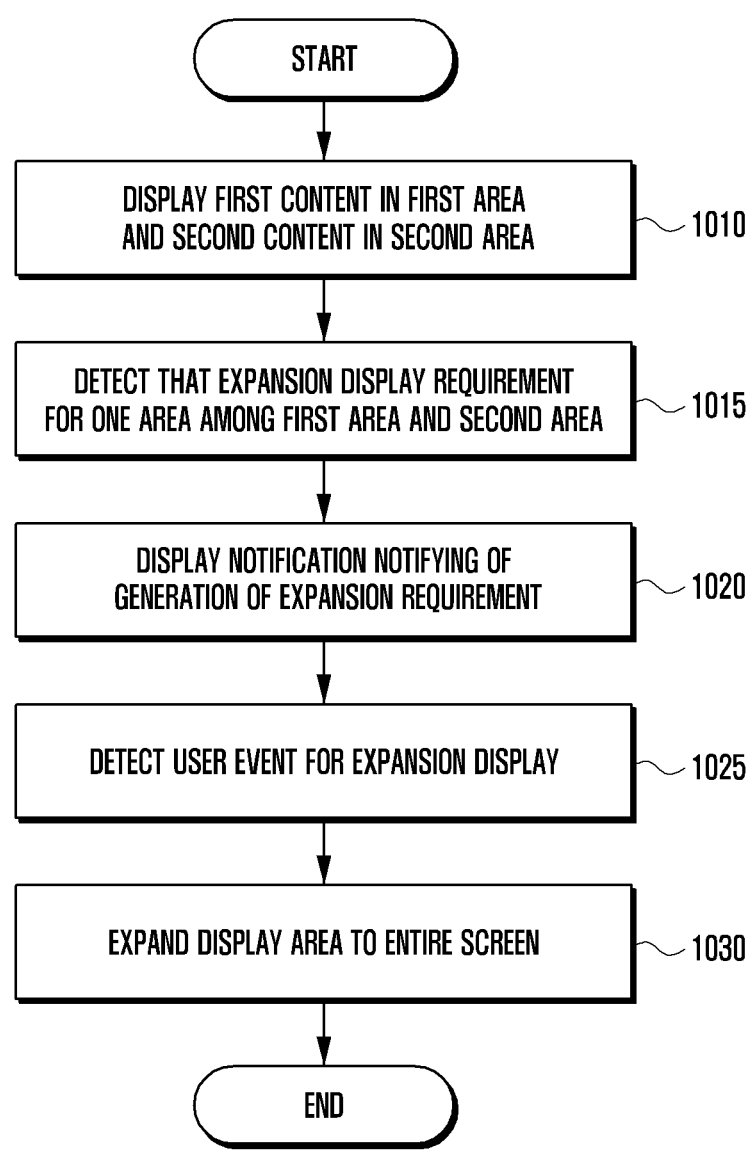
FIG. 10 is a flow chart illustrating a method of performing screen expansion according to an embodiment of the present invention.

By contrast, FIG. 9B illustrates an example in which a user holds a left side of the electronic device 100 in a horizontal orientation. When determining that the left side of the electronic device 100 is held, the controller 170 may display a first display area 901, which corresponds to an area in which a main task is displayed, on the left side close to the holding position and display a second display area 902, which corresponds to an area in which a sub-task is displayed, on the right side. Although the above-described examples merely refer to cases in which the first area 901 and the second area 902 are horizontally (display on the left side and right side) displayed, embodiments of the present invention are not limited thereto. Also, corresponding embodiments of the present function may be performed, even when the first area 901 and the second area 902 are vertically displayed FIG. 10 is a flow chart illustrating a method of performing screen expansion according to an embodiment of the present invention.

According to various embodiments of the present invention, a controller 170 may, in operation 1010, perform a method of displaying a first content in a first area and a second content in a second area. The controller 170 may detect that a display area expansion requirement occurs in one area among the first area and the second area in operation 1015. Then, the controller 170 may, in operation 1020, display a notification notifying the user that the display area expansion requirement occurs. For example, one area of the screen may correspond to a boundary line of each display area. Further, the notification may include a specific element for representing a display area in which the display area expansion requirement occurs.

Then, the controller 170 detects a user event for the display area expansion, in operation 1025. For example, the user event may correspond to a touch at a point where the notification is displayed or a dragging of the point, where the notification is displayed, in a direction indicating to a request to expand the display area.

When a user event for the display area expansion is detected, the controller 170 expands a corresponding display area to the entire screen, in operation 1030. Operation 1030 is described in further detail with reference to FIGS. 11A and 11B.

Figure 11A:
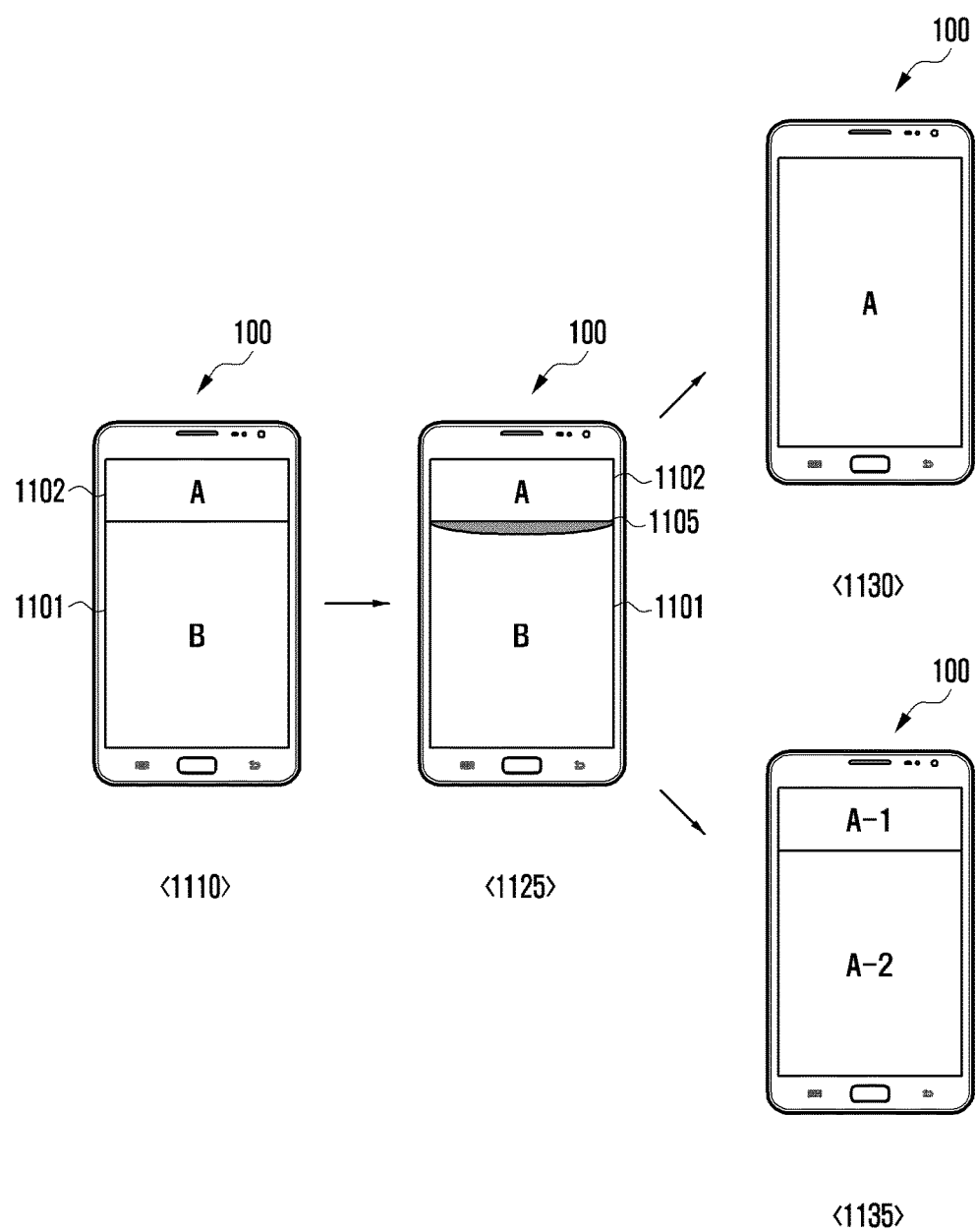
FIGS. 11A and 11B are diagrams illustrating a screen display area expansion operation according to an embodiment of the present invention.
Figure 11B:
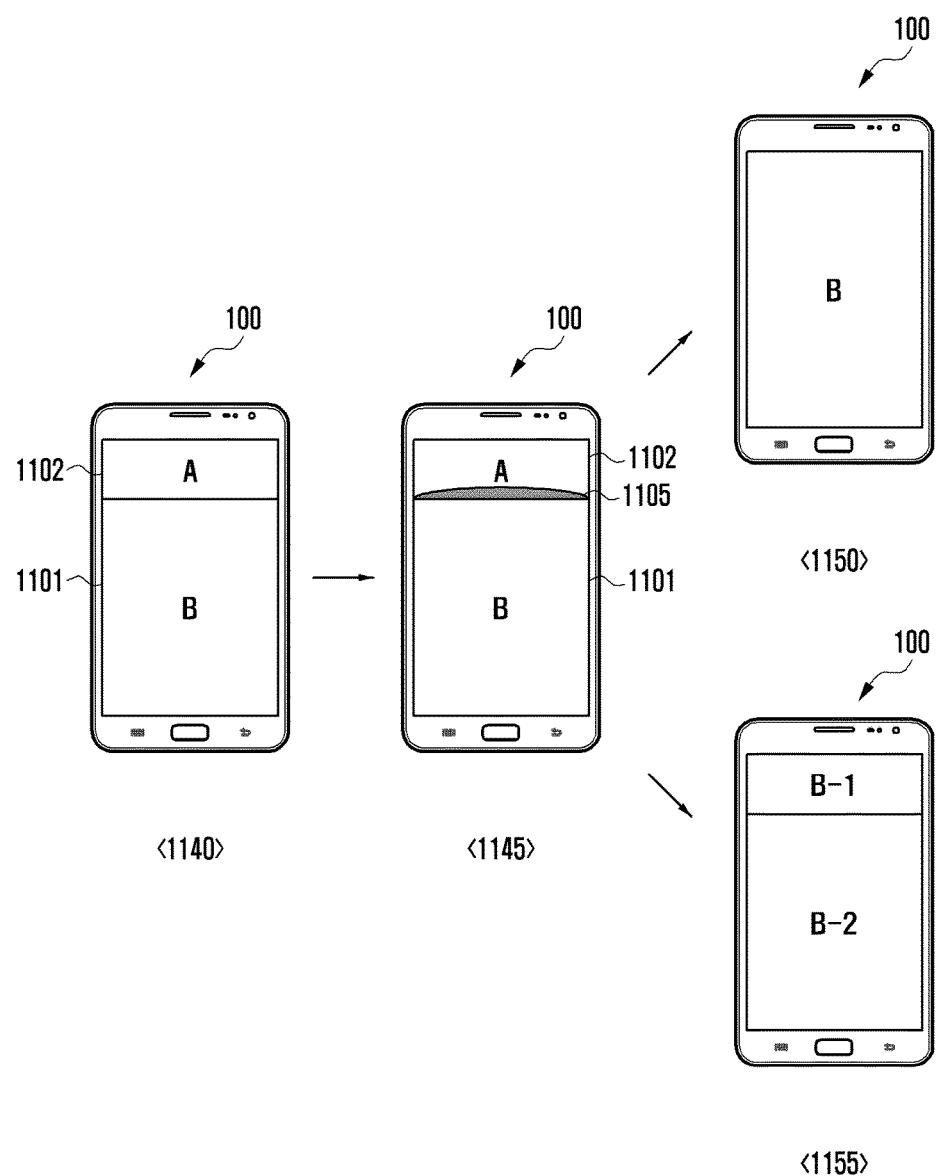

FIGS. 11A and 11B are diagrams illustrating a screen display area expansion according to an embodiment of the present invention. The view indicated by reference numeral 1110 in FIG. 11A illustrates that a first display area 1101, in which a main task is executed, is displayed at the lower end of a screen of the electronic device 100 and a second display area 1102, in which a sub-task is executed are displayed, at an upper end of the screen of the electronic device 100. In the multi-display environment, when a condition for expansion the second display area 1102 is satisfied, a notification 1105 may be displayed in an area (e.g., the first display area and/or the second display area) of the screen, as shown in the view indicated by reference numeral 1125. The notification may be displayed to the user, for example, in a form of flashing lights. Further, the notification 1105 may be displayed, for example, in a form in which the notification is convex in the direction of the expansion. In addition, the notification 1105 may provide a notification of a display area in which a condition for expanding display area is satisfied. For example, when the notification notifies the user of the expansion requirement related to the second display area, a position of the notification 1105 may be displayed on the first display area. In addition, the notification may be implemented by various methods to notify the user that a condition for expanding a display area of the screen has been satisfied.

When the notification 1105 is displayed in the second display area 1102, the controller 170 may determine whether an event corresponding to the notification is detected by the user. Specifically, when the notification 1105 is displayed on the screen, the controller 170 may identify whether a user event, such as receiving a touch input with respect to a corresponding object or drag on an object on the screen in a direction in which the screen is to be expanded, is generated. As shown in the view indicated by reference numerals 1130 or 1135, the controller 170 may expand the screen according to the detection of the user event requesting the display area expansion. Specifically, the view indicated by reference numeral 1130 is a diagram illustrating that a task, which is being executed in the second display area, is displayed over the entire combined area in which the first display area 1101 and the second display area 1102 were previously displayed. In addition, the controller 170 may display an expansion screen, as shown in the view indicated by reference numeral 1135, and in the view indicated by reference numeral 1135, control maintenance of a screen of the second display area 1102 and change of a screen of the first display area 1101 into an application execution screen, which has been displayed in the second display area 1102, to display an identical application in the first display area 1101 and the second display area 1102, respectively.

FIG. 11B illustrate performance of a screen expansion method when a condition for display area expansion is satisfied in a first display area 1101, in contrast to the example of FIG. 11A.

First, in a multi-display environment as shown in the view indicated by reference numeral 1140, condition for display area expansion for the first display area 1101 may be satisfied. For example, when additional information (e.g., a pop-up menu) corresponding to a task executed in the first display area 1101 is generated, the controller 170 may determine that the display area expansion condition has been satisfied. When the display area expansion condition for the first display area 1101 is satisfied, the controller 170 may display a notification 1105 for notifying of a display area expansion condition is satisfied in an area (e.g., a boundary between the first area and the second area) of the screen as shown in the view indicated by reference numeral 1145. When a user event (e.g., a touch with respect to a corresponding notification area, or a drag with respect to corresponding notification area) corresponding to the notification is detected, the controller 170 may expand and display a screen as shown in the view indicated by reference numerals 1150 or 1155. The view indicated by reference numeral 1150 illustrates display of a task displayed in the first display area 1101 by expanding the task to the entire screen in which the first display area 1101 and the second display area 1102 are combined. When the controller 170 expands the screen as shown in the view indicated by reference numeral 1155, the controller 170 may additionally display a widget or a pop-up window related to the task executed in the first display area 1101 in the second display area 1102.

Some devices (e.g., an electronic device or functions thereof) or methods according to embodiments of the present invention may be implemented by a command stored in a computer-readable storage medium in a programming module form. When the command is executed by at least one processor, the at least one processor may perform a function corresponding to the command. The computer-readable storage medium may be, for example, the storage or the memory. At least some of the programming modules may be implemented (for example, executed) by, for example, the processor. At least some of the programming modules may include, for example, a module, a program, a routine, a set of instructions or a process for performing one or more functions.

The computer readable recording medium may include magnetic media such as a hard disc, a floppy disc, and a magnetic tape, optical media such as a Compact Disc Read Only Memory (CD-ROM) and a DVD, magneto-optical media such as a floptical disk, and hardware devices specifically configured to store and execute program commands, such as a Read Only Memory (ROM), a Random Access Memory (RAM), and a flash memory. In addition, the program instructions may include high class language codes, which can be executed in a computer by using an interpreter, as well as machine codes made by a compiler. The aforementioned hardware device may be configured to operate as one or more software modules in order to perform the operation of the present invention, and vice versa.

A programming module according to embodiments of the present invention may include one or more of the aforementioned components or may further include other additional components, or some of the aforementioned components may be omitted. Operations executed by a module, a programming module, or other component elements according to various embodiments of the present invention may be executed sequentially, in parallel, repeatedly, or in a heuristic manner. Further, some operations may be executed according to another order or may be omitted, or other operations may be added.

While the invention has been shown and described with reference to certain embodiments thereof, it will be understood by those skilled in the art that various changes in form and detail may be made therein without departing from the spirit and scope of the invention as defined by the appended claims.

What is claimed is:
1. An electronic device comprising:
a display configured to, in one screen, display a first content through a first display area and a second content through a second display area;
a sensor configured to detect a rotation of the electronic device;
a camera configured to photograph a movement of a user's eye located in front of the electronic device; and
a processor configured to determine a position of a user's sight line in one of the first display area and the second display area by analyzing a movement of the user's eye photographed by the camera, and when the rotation of the electronic device is detected by the sensor, fill the entire display with the display area that was determined in the user's sight line.

2. The electronic device of claim 1, wherein, based on a determination that the position of the user's sight line corresponds to the second display area, the processor is further configured to fill the entire display with the second display area.

3. A method of controlling a screen display of an electronic device, the method comprising:
- displaying, in one screen, a first content through a first display area and a second content through a second display area;
- detecting a rotation of the electronic device;
- determining a position of a user's sight line in one of the first display area and the second display area based on a movement of a user's eye located in front of the electronic device when the rotation of the electronic device is detected; and
- displaying in the entire screen the display area that was determined in the user's sight line.

4. The method of claim 3, wherein determining the user's sight line was determined to be in the second display area;
- wherein displaying in the entire screen the display of the second display area.

\* \* \* \* \*